(No Model.)

C. W. HUNT.
MEANS FOR SETTING UP JOURNAL BOXES.

No. 512,826. Patented Jan. 16, 1894.

Witnesses
Chas. H. Smith
J. Staib

Inventor
Charles W. Hunt
per Lemuel W. Serrell
Atty.

UNITED STATES PATENT OFFICE.

CHARLES W. HUNT, OF WEST NEW BRIGHTON, NEW YORK.

MEANS FOR SETTING UP JOURNAL-BOXES.

SPECIFICATION forming part of Letters Patent No. 512,826, dated January 16, 1894.

Application filed May 29, 1893. Serial No. 475,931. (No model.)

*To all whom it may concern:*

Be it known that I, CHARLES W. HUNT, a citizen of the United States, residing at West New Brighton, in the county of Richmond and State of New York, have invented an Improvement in Means for Setting Up Journal-Boxes and Similar Devices, of which the following is a specification.

Upon the connecting rods of steam engines, locomotives, &c., the crank pin is surrounded by a box and it is necessary to keep one half of the box pressed up closely against the crank pin to prevent looseness and to take up wear. The same is true in pillow blocks and other bearings for shafts in various kinds of machinery.

My present invention is especially intended to setting up the box from time to time to take up any wear or looseness and it is available with boxes or brasses made use of on connecting rods, pillow blocks and in machinery generally, and by my improvement the risk of the parts becoming loose or injured is reduced to a minimum. I make use of a series of balls, preferably of steel and of various diameters introduced into a cavity adjoining the box or brass that is to be set up, and I provide a screw, sometimes having a tapering point, that passes into the hole through which the balls may be introduced, and such screw pressing upon the balls causes them to come into intimate association and bearing one upon the other and also upon the box that is to be set up, and these balls slide one upon the other as pressed upon by the screw, so as to exert the necessary force against the whole of the outer surface of the box or bearing to press the same to its position.

Figure 1:
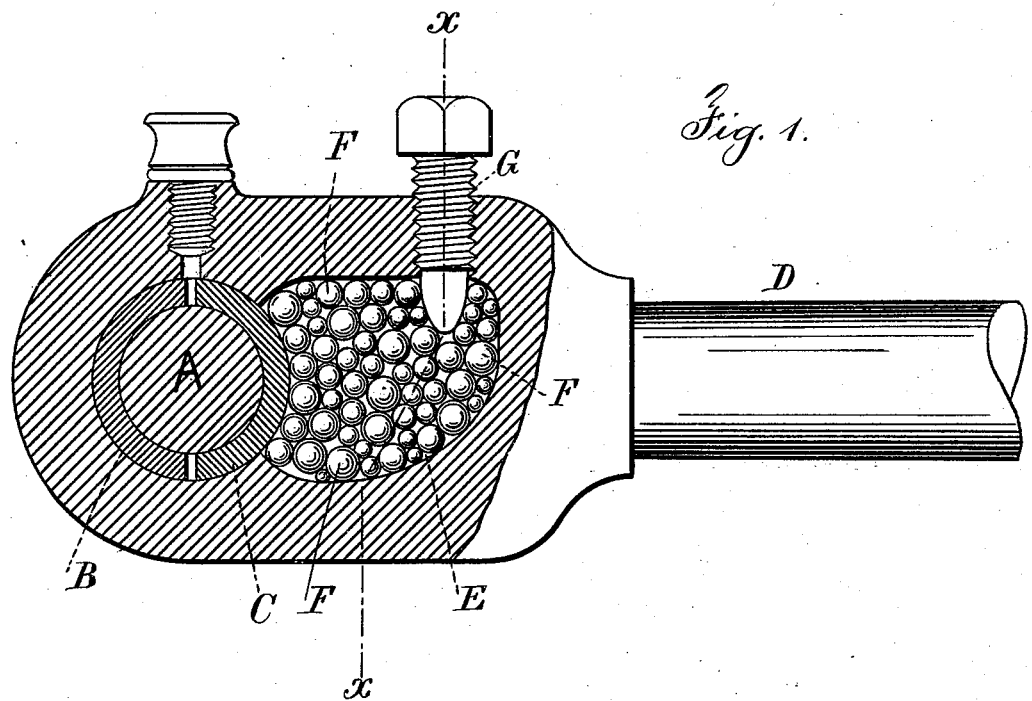
Figure 2:
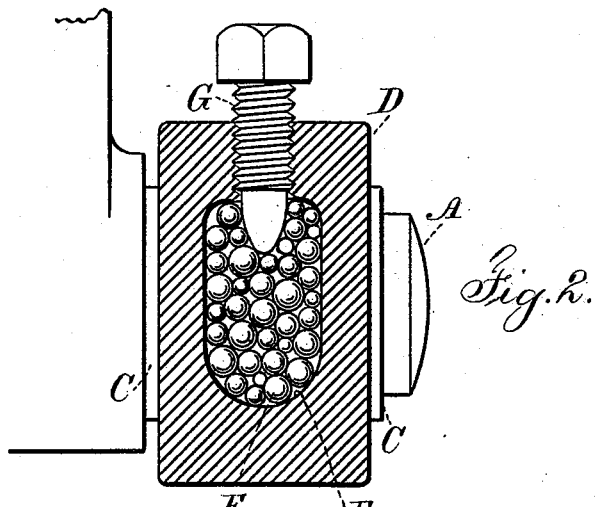

In the drawings, Figure 1 is an elevation partially in section illustrating this improvement as applied to the boxes or brasses of a connecting rod. Fig. 2 is a cross section at the line x x.

The crank pin or shaft at A is provided with the brasses or boxes B C and these are held in any suitable support such as the end of the connecting rod D, and adjacent to one of the boxes there is a cavity E into which are inserted balls or spheres F, preferably of hard steel, and by making use of balls or spheres of different sizes I am enabled to obtain a substantially fluid condition, so that the screw G when it is pressed upon the spheres causes one to roll upon another and a pressure to be exerted around all sides of the cavity E and against one side of the box C so as to press the same with the desired force against the crank pin or shaft A. It is preferable to make the opening for the screw G sufficiently large for the balls to pass freely through the same and into the cavity and to introduce lubricating material with the balls for the twofold purpose of preventing rust and for causing the balls to slide or roll freely one upon the other under the action of the screw G as the same may be set up from time to time; and it will be observed that there is no hammering or loosening action exerted upon the screw G. Hence the same is not liable to turn or to become loose, and when the parts have come to a proper bearing any wear or looseness can be taken up with great facility by a slight turn of the screw G.

I am aware that balls have been introduced through a hole into a cavity and the hole has been closed by a screw, but no device received motion from the pressure of the screw transmitted through the balls. In my present improvement the part D, having a cavity is the holder for the balls; it however may be of any desired size or shape and the journal box is the device to be moved, but it may be any other device, and the pressure on the balls by the screw or equivalent mechanism is transmitted through the balls to the device to be moved and in consequence of the balls being of different sizes they do not become wedged together but roll freely as the parts are set up.

In practice I find that when balls of the same size are used they pile with regularity similar to pyramids and wedge into the cavity, and there is not a tendency to press in any direction, but when the balls are of different sizes they will not pile or pack, but slide and move one on the other similar to a liquid and hence press in any direction within the cavity when acted on by the screw.

I claim as my invention—

1. The combination with a shaft, crank pin or journal and the journal box or bearing having one movable side; of the metal support for the journal box having a cavity adjacent to the movable side of said box and an opening into the cavity, balls or spheres within the cavity and adjacent to the box, and means for pressing upon the balls or spheres and thereby setting up the movable sides of the box to the journal, substantially as set forth.

2. The combination with the device to be adjusted, of a holder for the same having a cavity and balls of different sizes within that cavity, and mechanism acting against the balls to press upon the same and transmit motion to the device to be adjusted, substantially as specified.

Signed by me this 25th day of May, 1893.

CHAS. W. HUNT.

Witnesses:
GEO. T. PINCKNEY,
A. M. OLIVER.